(12) United States Patent
Hagg et al.

(10) Patent No.: US 9,472,189 B2
(45) Date of Patent: Oct. 18, 2016

(54) LANGUAGE PROCESSING METHOD AND INTEGRATED CIRCUIT

(71) Applicant: Sony Corporation, Minato-ku (JP)

(72) Inventors: Wilhelm Hagg, Korb (DE); Thomas Kemp, Esslingen (DE); Fritz Hohl, Stuttgart (DE)

(73) Assignee: SONY Corporation, Tokyo (JP)

( * ) Notice: Subject to any disclaimer, the term of this patent is extended or adjusted under 35 U.S.C. 154(b) by 268 days.

(21) Appl. No.: 14/054,022

(22) Filed: Oct. 15, 2013

(65) Prior Publication Data

US 2014/0129227 A1 May 8, 2014

(30) Foreign Application Priority Data

Nov. 2, 2012 (EP) .................................. 12007485

(51) Int. Cl.
*G10L 15/183* (2013.01)
*G10L 15/19* (2013.01)

(52) U.S. Cl.
CPC .............. *G10L 15/183* (2013.01); *G10L 15/19* (2013.01)

(58) Field of Classification Search
CPC ............. G06F 17/2785; G06F 17/274; G06F 17/30684; G06F 17/27
See application file for complete search history.

(56) References Cited

U.S. PATENT DOCUMENTS

| | | | | |
|---|---|---|---|---|
| 5,687,384 A * | 11/1997 | Nagase | .................. | G06F 17/271 704/2 |
| 5,761,631 A * | 6/1998 | Nasukawa | ............ | G06F 17/271 704/9 |
| 6,236,959 B1 * | 5/2001 | Weise | .................. | G06F 17/2705 704/9 |
| 8,103,503 B2 | 1/2012 | Duncan | | |
| 8,660,969 B1 * | 2/2014 | Hall | ..................... | G06F 17/2705 706/12 |
| 2003/0074184 A1 * | 4/2003 | Hayosh | ............... | G06F 17/2775 704/1 |
| 2011/0313757 A1 * | 12/2011 | Hoover | ................. | G06F 17/274 704/9 |

FOREIGN PATENT DOCUMENTS

| | | |
|---|---|---|
| EP | 0 361 570 B1 | 4/1990 |
| EP | 1 043 711 B1 | 10/2000 |
| JP | 2005-92849 | 4/2005 |

OTHER PUBLICATIONS

Prost, Jean-Philippe. Modelling Syntactic Gradience with Loose Constraint-based Parsing. Diss. Université de Provence-Aix-Marseille I; Macquarie University, 2008.*

(Continued)

*Primary Examiner* — Matthew Baker
(74) *Attorney, Agent, or Firm* — Oblon, McClelland, Maier & Neustadt, L.L.P.

(57) ABSTRACT

A parse unit parses an input sequence of token elements for an input string, wherein each token element contains a token and/or at least one corresponding token classifier. In a first mode the parse unit applies regular production rules on the token elements and on multi-token classifiers for phrases obtained from the token classifiers. If the first mode parsing does not result in a multi-token classifier encompassing all tokens of the input string, a control unit controls the parse unit to parse the input sequence in a second mode that applies both the regular and artificial production rules. A rule generator unit generates the artificial production rules based on the input sequence and/or intermediate results of the parsing. The parser unit provides a complete parse tree for ungrammatical sentences and a solution where the regular production rules do not cover the complete grammar of the respective natural language.

13 Claims, 9 Drawing Sheets

(56) References Cited

OTHER PUBLICATIONS

Foster, Jennifer. "Treebanks gone bad." International Journal of Document Analysis and Recognition (IJDAR) 10.3-4 (2007): 129-145.*
Rose, Carolyn Penstien, and Alon Lavie. "An efficient distribution of labor in a two stage robust interpretation process." arXiv preprint cmp-lg/9706021 (1997).*
Lin, Yi-Chung, and Keh-Yih Su. "A Level-Synchronous Approach to Ill-formed Sentence Parsing and Error Recovery." Computational Linguistics 4.1 (1999): 2558.*
Kakkonen, Tuomo. "Robustness evaluation of two CCG, a PCFG and a link grammar parsers." arXiv preprint arXiv:0801.3817 (2008).*
Jennifer Foster, et al., "Parsing Ill-formed Text using an Error Grammar", Apr. 2, 2004, 24 pages.
Richard G. Morgan, et al., "Translation by Meaning and Style in Lolita", Oct. 1994, 25 pages.
A. Avellone, et al., "Analysis of Algorithms for the Recognition of Rational and Context-Free Trace Languages", Informatique theorique et Applications / Theoretical Informatics and Applications, vol. 32, No. 4-5-6, 1998, 13 pages.
E.A. Grubbs, et al., "Understanding natural language for virtual reality: An information theoretic approach", AI, Simulation, and Planning in High Autonomy Systems, Integrating Virtual Reality Model-Based Environments. Proceedings. Fourth Annual Conference, http://ieeexplore.ieee.org/search/freesrchabstract.jsp?openedRefinements=*&arnumber=41 . . . , Sep. 20-22, 1993, 1 page.

* cited by examiner

LANGUAGE PROCESSING METHOD AND INTEGRATED CIRCUIT

BACKGROUND

1. Field of the Disclosure

The present disclosure relates to a natural language processing method parsing an input string using a parsing algorithm and regular production rules. The disclosure further relates to an integrated circuit and an electronic device for language processing.

2. Description of Related Art

Language processing methods segment a user utterance into sentences and the sentences into tokens, e.g. words or phrases. Syntax parsers use the tokens to determine a syntactical structure in the sentence. Thereby the syntax parsers use algorithms based on a grammar that describes the syntactical relationships between the words of a sentence. The grammar is embodied by a plurality of production rules, wherein each production rule corresponds to a grammatical rule that describes how pairs of words and multi-word phrases can be combined with each other to obtain multi-word phrases of a certain phrase type. A grammatically correct sentence can be represented by a parse tree. Information in terminal cells of the parse tree describes the lexical category of the tokens. Any possible multi-word phrase within the sentence is assigned to a non-terminal cell. Information in the non-terminal cells describes (i) the phrase type of the multi-word phrase and (ii) how the multi-word phrase is construed from the words. Accordingly, information in a root cell describes how the sentence is construed from the words and multi-word phrases and which grammatical rules are used to build up the sentence. Natural languages show ambiguities with respect to both the lexical category of tokens and the grammatical rules such that often more than one grammatical rule may be applied and a parse forest with a plurality of parse trees may result for the same sentence. In advanced parsers, probability values may accompany grammatical rules and/or tokens and, when applying matching production rules, the syntax parser may consider the probabilities to prefer a parse tree with a higher probability.

It is an object of the embodiments to provide an improved natural language processing method and an integrated circuit as well as an electronic device for improved natural language processing.

SUMMARY

An embodiment refers to a language processing method. An input sequence includes token elements, wherein each token element contains a token of an input string and/or at least one corresponding token classifier. Using a parsing processor, the input sequence is parsed by a parsing algorithm in a first mode, wherein the parsing algorithm applies regular production rules on the token elements and on multi-token classifiers for phrases obtained from the token elements. If the first mode parsing does not result in a multi-token classifier encompassing all tokens of the input string, the parsing processor is controlled to parse the input sequence using the parsing algorithm in a second mode that applies both the regular production rules and artificial production rules. The second mode parsing comprises generating the artificial production rules on the basis of the input sequence and/or intermediate results of the parsing.

Another embodiment refers to an integrated circuit. An input sequence includes token elements, wherein each token element contains a token of an input string and/or at least one corresponding token classifier. A parse unit receives and parses the input sequence using a parsing algorithm in a first mode, wherein the parsing algorithm applies regular production rules on the token elements and on multi-token classifiers for phrases obtained from the token elements. A control unit is connected to the parse unit. If the first mode parsing does not result in a multi-token classifier encompassing all tokens of the input string, the control unit controls the parse unit to parse the input sequence using the parsing algorithm in a second mode that applies both the regular production rules and artificial production rules. A rule generator unit generates the artificial production rules on the basis of the input sequence and/or intermediate results of the parsing.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings. The elements of the drawings are not necessarily to scale relative to each other. In the following drawings, like reference numerals designate identical or corresponding parts throughout the several views. Features of the illustrated embodiments can be combined with each other to form yet further embodiments.

DESCRIPTION OF THE EMBODIMENTS

Figure 1:
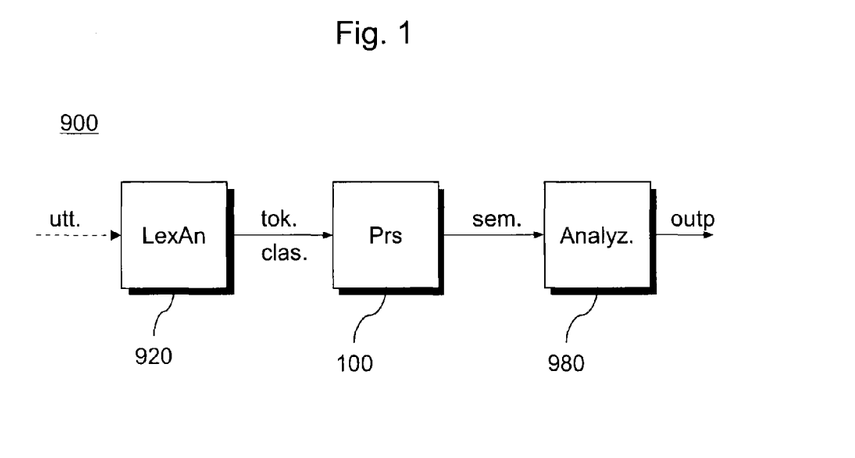
FIG. 1 is a schematic block diagram of an electronic device including a language processing unit in accordance with an embodiment.

FIG. 1 refers to a speech processing section of an electronic device 900. The electronic device 900 may be a portable device, for example a cellular phone, a personal digital assistant, a portable computer, a tablet computer, a portable man-machine dialogue apparatus or a stationary device, for example a client terminal, a telephone answering machine, a man-machine interface of an apparatus or equipment, for example a machine tool, or an on-board vehicle computer, by way of example.

A lexical analyzer unit 920 receives an user utterance, segments the user utterance in separated strings of tokens, determines boundaries of individual tokens within the strings of tokens, for example boundaries between words and syllables, and categorizes the tokens as regards specific aspects. For example, the lexical analyzer unit 920 may compare the tokens obtained from the user utterance with predefined tokens stored in a memory to define the parts of speech (lexical category) each token belongs to. The quality of a token depends on the target language for which the lexical analyzer unit 920 is designed. For English, each token may correspond to a word, and the lexical category may be the pertinent part of speech, inter alia verb, noun, pronoun, article, preposition. The lexical analyzer unit 920 may also determine additional information descriptive for each token, for example information about flexion, tense, number and gender. The lexical analyzer unit 920 may output a string of tokens contained in the user utterance, in some embodiments also the lexical information and/or the additional information. For example, the lexical analyzer unit 920 may output a sequence of token elements obtained from an associated string of tokens included in the user utterance. Each token element may contain a token of the string of tokens, and/or at least one corresponding token classifier including the lexical category of the token, and further token attributes. Each token contained in the user utterance is represented by a token element that may contain at least one or more token classifiers identifying the lexical category of the respective token.

A parser unit 100 receives an input sequence of token elements corresponding to an input string containing a plurality of tokens from the lexical analyzer unit 920. Each token element may contain a token of the string of tokens, and/or at least one corresponding token classifier including the lexical category of the token, and further token attributes containing further information about the respective token, e.g. number, gender, case, person, and/or tense. The parser unit 100 parses the input sequence of token elements for analyzing the syntax of the input string and outputs semantic information descriptive for the relationships among the tokens. For example, the parser unit 100 outputs semantic information indicating which token or sequence of tokens represents the subject and which token or sequence of tokens represents the object in the input string.

An analyzer unit 980 uses the semantic information received from the parser unit 100 to further analyze and process the information obtained by the lexical analyzing unit 920 and the parser unit 100. The analyzer unit 980 may be an interpreter transforming the input string in a matching one of a plurality of predefined machine commands. According to other embodiments, the analyzing unit 920 may translate the user utterance into another natural language.

Figure 2A:
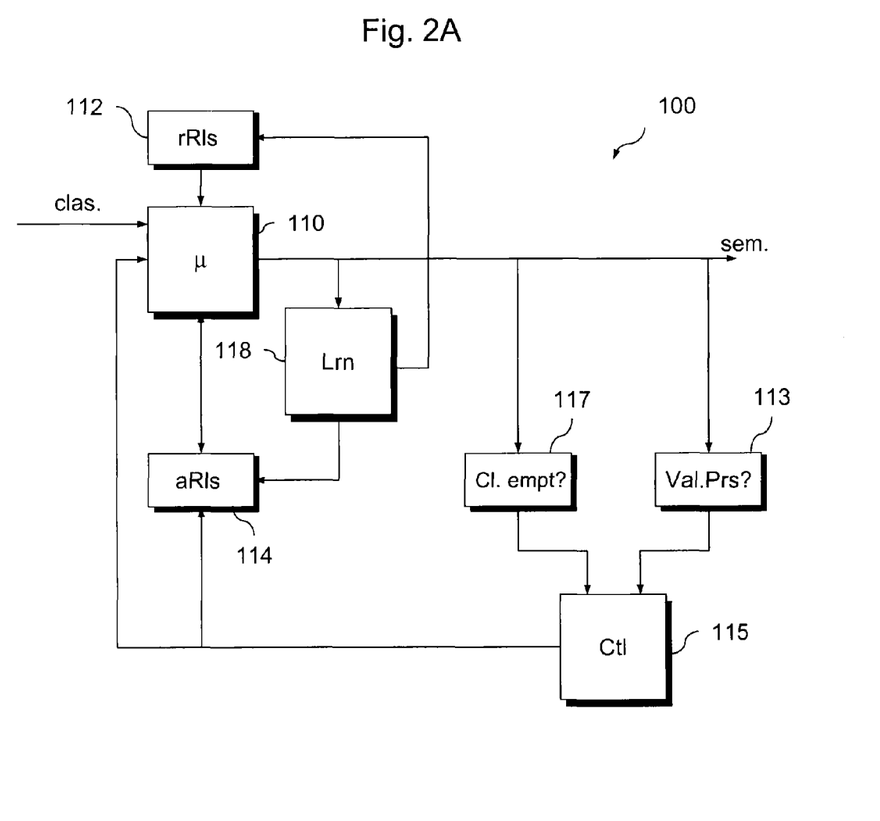
FIG. 2A is a schematic block diagram of a language processing unit according to an embodiment providing a configurable parser unit.

FIG. 2A shows an embodiment of the parser unit 100 in more detail. According to an embodiment a parser processor 110 receives an input sequence of token elements for an input string including tokens. The token elements may include token classifiers representing the lexical category of a respective token and/or the tokens. According to another embodiment the parser processor 110 may receive the input string with or without additional information describing the lexical category of the tokens contained in the input string and generates the corresponding input sequence of token elements for the input string. The parser processor 110 applies a parser algorithm, which is based on a grammar describing the syntactical relations between the components of grammatically correct (grammatical) sentences of a predefined target language, for example English or Japanese. The grammar is laid down in a set of regular production rules emulating corresponding grammatical and syntactical rules of the target language. The production rules use constituent information descriptive for a grammatical function of a token represented by its token classifier or its content or of a multi-token phrase included in the input string and represented by its multi-token classifier.

The parser processor 110 may use production rules describing a context free grammar, wherein the left hand side of each production rule describes the token classifier or constituent information of only one single multi-phrase token, whereas the right hand side contains the token classifiers, constituent information or content information of two tokens, one token and one multi-phrase token, or two multi-phrase tokens.

In accordance with an embodiment the parser algorithm applies an HPSG (head-driven phrase structure grammar). The HPSG provides production rules that describe the expansion of a constituent A to a pair of constituents B and C as given by production rule (1):

$$A \rightarrow B\ C. \tag{1}$$

Production rule (1) describes the join of two constituents B and C into a constituent A, wherein each of the constituents B and C may be a token, a token classifier or a multi-token classifier and constituent A may be a multi-token classifier. The head-driven approach is based on the semantic assumption that any multi-token phrase joining two child constituents has a head word with the same syntactic function as one of the child constituents. By applying production rules according to the pattern of production rule (1), each multi-token classifier or "sequence" representing more than two tokens includes at least one "subsequence" consisting of two token classifiers. According to a further embodiment, the parser processor 110 applies the CYK (Cocke-Younger-Kasami) algorithm.

The operation of the parser algorithm can be illustrated by means of a triangular parse table. The token elements of the input sequence of an input string of tokens are successively assigned to terminal cells that form a base line of the parse table. The number of terminal cells is equal to the number of tokens in the input string. A token element assigned to a terminal cell may describe the lexical category of the respective token. Since some tokens are ambiguous as regards their lexical category, a terminal cell may contain more than one token classifiers.

A second line of the parse table is shorter than the base line by one cell and contains non-terminal cells. Each non-terminal cell of the second line is assigned to two terminal cells directly neighboring each other and refers to a unique sequence of tokens within the input string. If at least one regular production rule exists that allows to combine the two concerned neighboring token elements, information assigned to the non-terminal cell in the second line contains (i) constituent information descriptive for one or more grammatical functions of the concerned sequence as assigned by the applied production rules and (ii) sub tree information descriptive for the kind of derivation of the non-terminal cell from the lexical categories of the concerned tokens. Otherwise, if no regular production rule combines the two concerned neighbouring token elements, no information is assigned to the respective non-terminal cell. Speaking in metaphoric words, the cell remains "empty".

Further lines of the triangular parse table are formed accordingly. The number of lines is equal to the number of tokens in the input string. The final line of the parse table consists of only one cell, the so-called root cell. If the input string represents one grammatical sentence of the target language and if the sentence can be described with the regular production rules, the root cell is the only cell containing both (i) the constituent information defining a complete sentence and (i) a complete parse tree information descriptive for the derivation of the sentence from the lexical categories of all tokens in the input string. The complete parse tree links the root cell exactly once with each of the terminal cells via intermediate non-terminal cells.

Figure 2B:
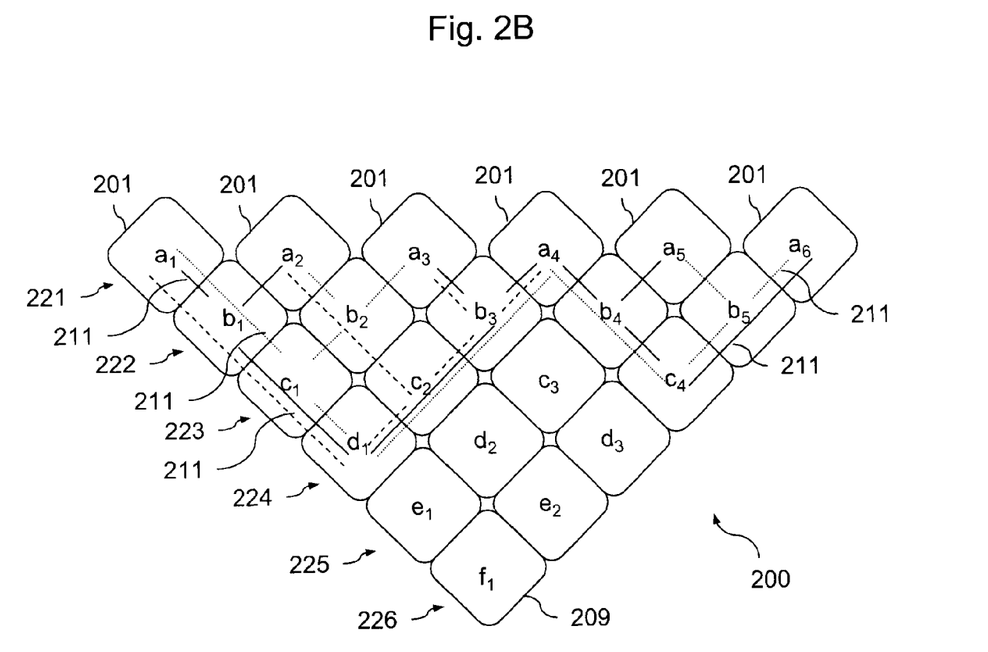
FIG. 2B is a schematic diagram of a parse table for illustrating the mode of operation of a parsing algorithm according to an embodiment.
Figure 2C:
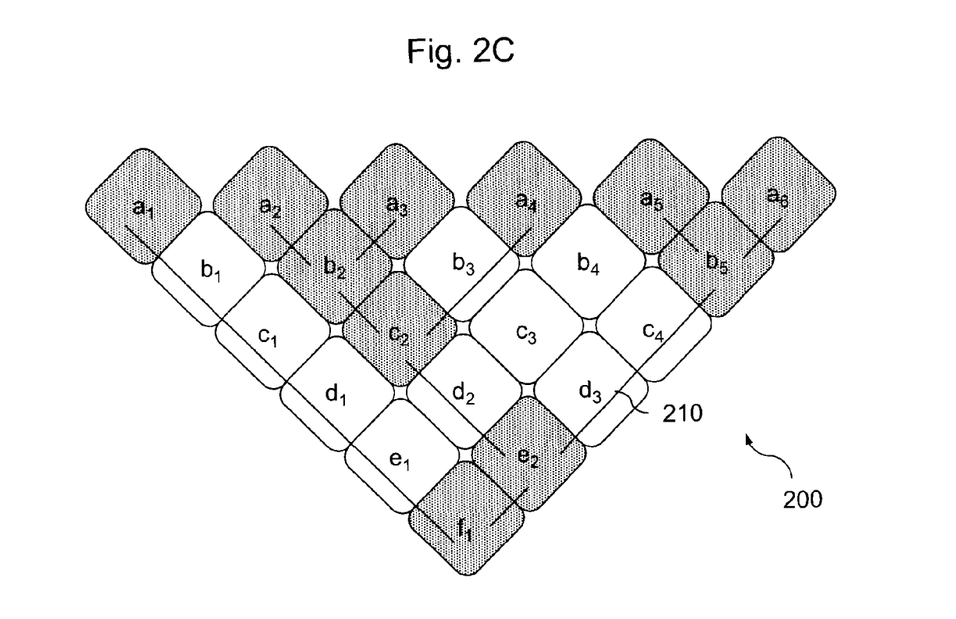
FIG. 2C is a further schematic diagram of a parse table for illustrating a parse tree generated by the parsing algorithm of FIG. 2B.

FIGS. 2B and 2C illustrate the generation of parse trees 210 and sub-trees 211 in parse tables 200. The token elements may contain token classifiers. The token classifiers of an input sequence of token classifiers for an input string are successively assigned to terminal cells a1 . . . a6 in a base line 221 of the table 200. The token classifiers assigned to each neighboring pair of terminal cells 201 may be combined by regular production rules to obtain a multi-token classifier assigned to one of the non-terminal cells b1 . . . b5 in a second line 222, which is shorter than the base line 221 by one cell. Multi-token classifiers assigned to the non-terminal cells c1 . . . c4 of the third line 223 are defined by production rules combining a non-terminal cell b 1 . . . b5 from the second line 222 and a terminal cell a1 . . . a6 from the base line 221. Each further line of the parse table 200 is shorter than the preceding line by one cell. The final line 226 has only one cell representing the root cell 209. Any intermediate non-terminal cell in a line between the base line 221 and the final line 226 is assigned to all terminal cells assigned to the base of a triangle which top is the respective cell.

The parse algorithm generates a plurality of potential sub-trees 211 for each cell by combining the regular production rules with the sub-parses within the respective triangle. For example, the non-terminal cell c4 in the third line 223 has the possible sub-parses a4 b5 and b4 a6 . The cell d1 in the fourth line 224 has five possible sub-parses c1 a4, including (b1 a3) a4 and (a1 b2) a4, b1 b3, and a1 c2, including a1 (b2 a4) and a1 (a2 b3).

Natural languages contain ambiguities such that often more than one grammatical rule may be applied and a parse forest including a plurality of parse trees may result from the same input string. Hence the parser processor 110 considers a probability value accompanying each production rule and locally selects the best fitting production rule for each cell such that the parse algorithm outputs one single parse tree as the most probable parse of the input string as exemplarily shown in FIG. 2C, wherein the shaded cells build the sentence.

Referring back to FIG. 2A, a memory 112, which may be a non-volatile memory, may store the regular production rules and probability values accompanying each production rule. The parser processor 110 parses each newly received input sequence in a first mode (regular mode) using the regular production rules stored in the memory 112. A monitoring unit 113 may check whether the parser processor 110 delivers at least one complete parse for the respective input sequence. If the parser processor 110 successfully completes the parse, the parser processor 110 outputs the semantic information and parses the next input sequence. If the monitoring unit 113 detects that the parser processor 110 has not obtained at least one complete parse for the given input sequence, a control unit 115 may control the parser processor 110 to repeat the parse for the input sequence in a second mode (recovery mode) using artificial production rules in addition to the stored regular production rules. The parser processor 110 applies the artificial production rules only if the regular production rules do not deliver a valid parse.

In the recovery mode, a tracing unit 117 may check, for each non-terminal cell, whether the parsing processor 110 has obtained at least one parse on the basis of the regular production rules alone. If not, the control unit 115 may control a rule generator unit 114 to generate artificial production rules and may control the parsing processor 110 to apply one of the artificial production rules. As a result, in the recovery mode the parser processor 110 applies artificial production rules only for empty cells for which the regular production rules do not provide a valid sub parse. In other words, for every possible sequence of token classifiers within the input sequence the tracing unit 117 checks whether the sequence can be construed on the basis of the regular production rules. Only when the sequence cannot be construed on the basis of the regular production rules, the parsing processor applies one of the artificial production rules to obtain constituent information descriptive for one or more grammatical functions of the sequence.

In both modes the parsing processor 110 may consider probability values to select the most promising sub-tree among a plurality of possible sub-trees for further processing. In accordance with an embodiment, each artificial production rule is provided with a probability value that is lower than any of the probabilities of the regular production rules. For example, the highest probability value of an artificial rule may be $10^{-1000}$. This ensures that for the complete parse of an input sequence at most one artificial production rule is used in most cases.

Other than approaches providing an error grammar which is based on linguistic analysis, the rule generator unit 114 may generate the artificial production rules on the basis of the input sequence and intermediate results of the parsing, e.g. the constituent information of the tokens or multi-token phrases which shall be combined by the artificial production rule. Since finally the constituent information of each non-terminal cell is based on the token classifiers in the terminal cells, the rule generator unit 114 more or less directly derives the artificial production rules from the lexical categories of the tokens of the input string.

According to the embodiments, the parser unit 100 provides complete parse trees for a wide range of input strings, for example for ungrammatical sentences. Further the parser unit 100 provides a solution for cases where the regular production rules do not cover the complete grammar of the respective natural language. Hence, the embodiments provide a robust parser that easily recovers from missing rules in a grammar. The parser unit 100 adds additional parses to the parse table during parsing by generating a set of appropriate artificial production rules. The artificial production rules are applied in addition to the regular production rules where the regular production rules do not find a sub tree for a certain non-terminal cell in the parse table. The parse algorithm optimizes the compound probability of all production rules in a complete parse tree. From all parses generating the information assigned to one of the non-terminal cells, only the one with the highest probability is further processed before the algorithm proceeds with processing the next cell in the parse table. Since the artificial production rules have low probability values, the parser processor 110 applies only a minimum number of the artificial production rules. Most of the parse tree remains based on regular production rules.

FIGS. 3A to 3F refer to embodiments of the generation of the artificial production rules. When the parsing algorithm reveals that no regular production rule can be applied to obtain the symbol for a certain non-terminal cell, the rule generator unit 114 may determine all possible sub trees (child phrases) which can be combined to fill the searched cell provided a production rule would exist that combines the two concerned child phrases. FIGS. 3A to 3F show parse tables with all child phrase pairs whose combinations fill the root cell marked with "x" in the upper left corner. The token classifiers of the input sequence fill the tree leafs in the first line 221 of the parse tables 200. In each of FIGS. 3A to 3F, the shaded cells represent the cells covered by the two child phrases, each child phrase representing information on the best parse sub-tree within the respective child phrase.

Figure 3A:
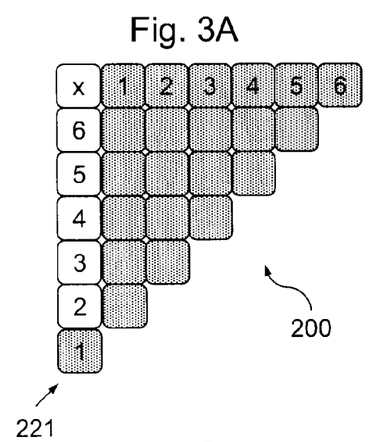
FIGS. 3A-3F are schematic parse tables for illustrating the generation of artificial production rules according to an embodiment.
Figure 3B:
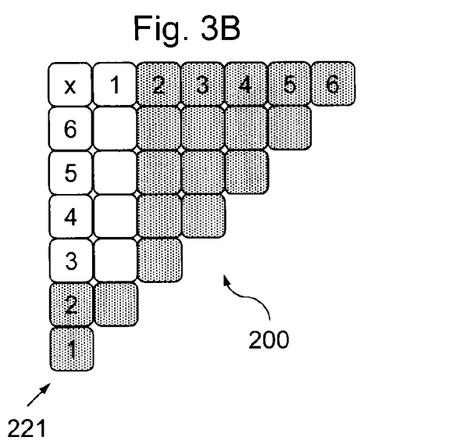
Figure 3C:
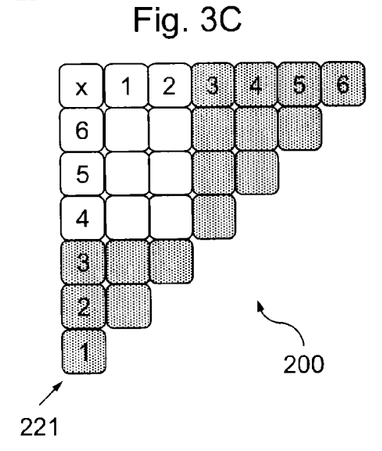
Figure 3D:
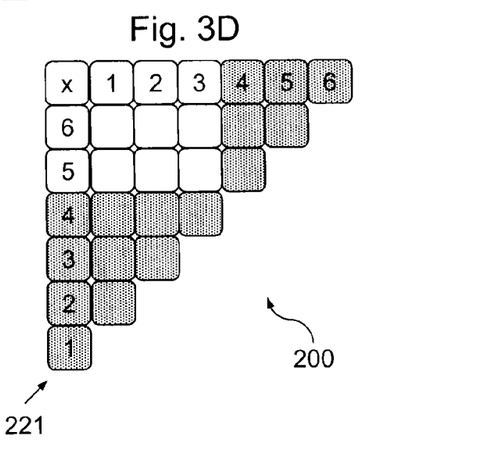
Figure 3E:
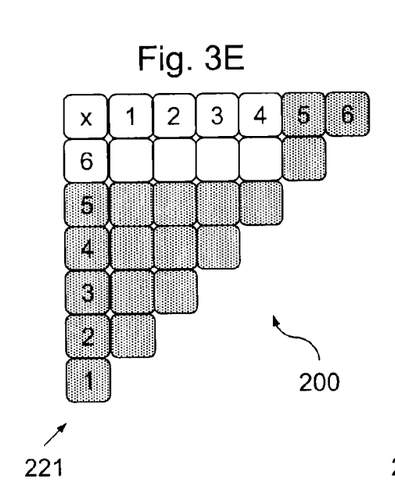
Figure 3F:
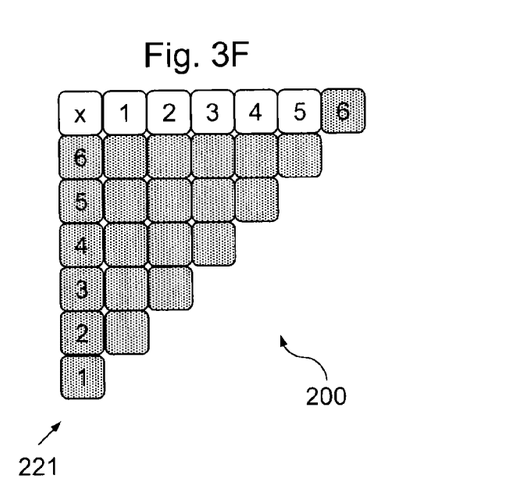

For example, FIG. 3A shows cells marked with "1" representing a child phrase pair which may be combined to fill the root cell marked with "x". The shaded cells represent the cells covered by the two child phrases. The cells marked with "1" include information on the best parse sub-tree within the respective child phrase. In FIG. 3B the cells marked with "2" represent a child phrase pair which may build the root cell, in FIG. 3C the cells marked with "3" and so on. For the illustrated example, six child phrase pairs exist.

For each child phrase pair the rule generator unit 114 may generate two new rules, one with the constituent information of the left and one with the constituent information of the right child phrase on the left hand side of the production rule, whereas the right hand sides of both production rules combine the constituent information of both child phrases. This allows the CYK algorithm to select the correct head for the artificial production rule from the context. Further, the rule generator unit 114 sets a probability for the generated artificial production rule which is a compound probability considering the probability for the left and right sub tree and the rule probability which may be a tiny value, e.g. $10^{-1000}$. The compound probability may be computed as a product of these probabilities, which is equal to the sum of probabilities if the probabilities are organized in the log domain. The rule generator unit 114 provides the rules together with the compound probability to the parser processor 110.

Figure 4A:
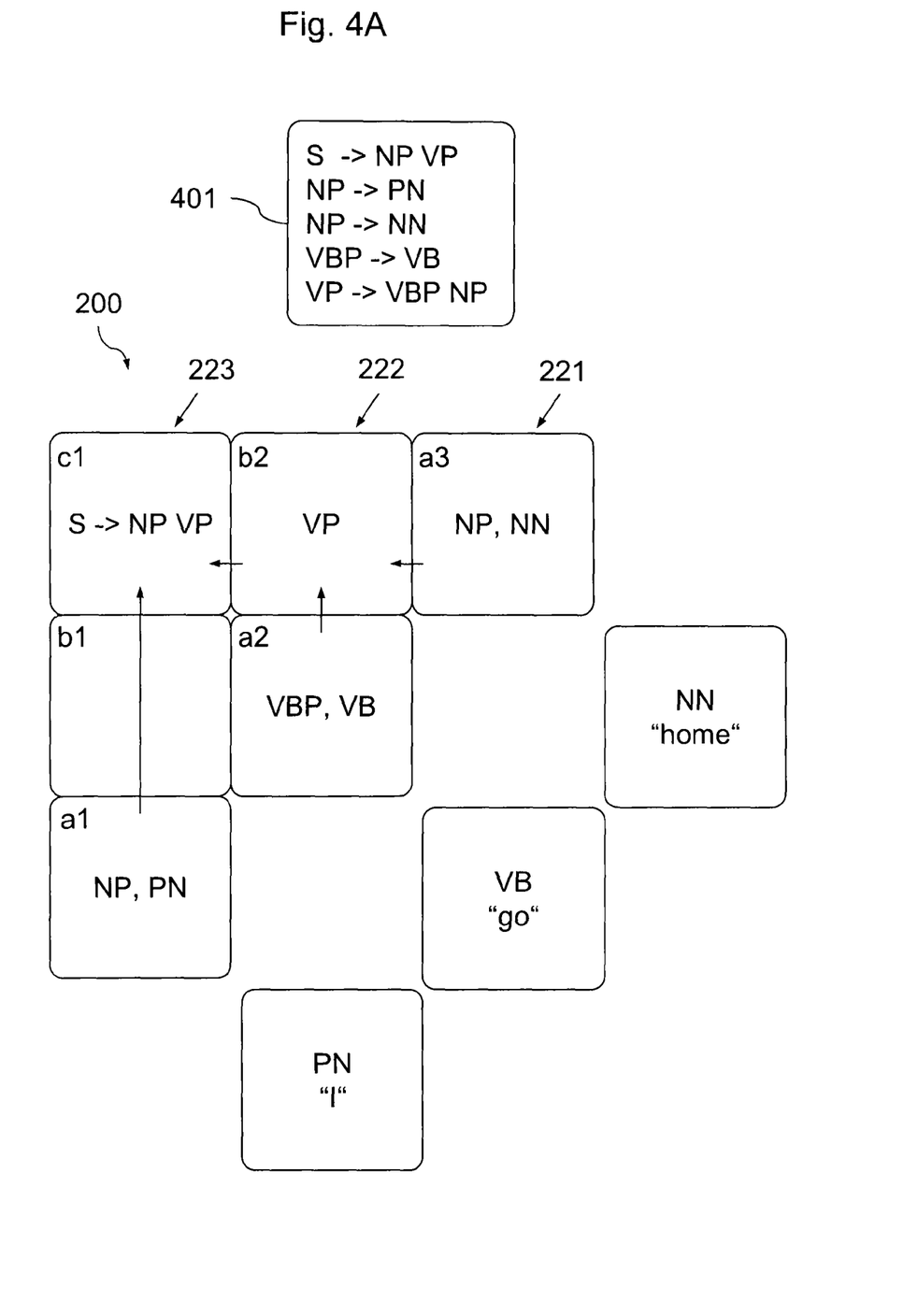
FIG. 4A is a schematic diagram of a parse table and a rule set with regular production rules for illustrating parsing of a grammatically correct sentence in accordance with an embodiment.
Figure 4B:
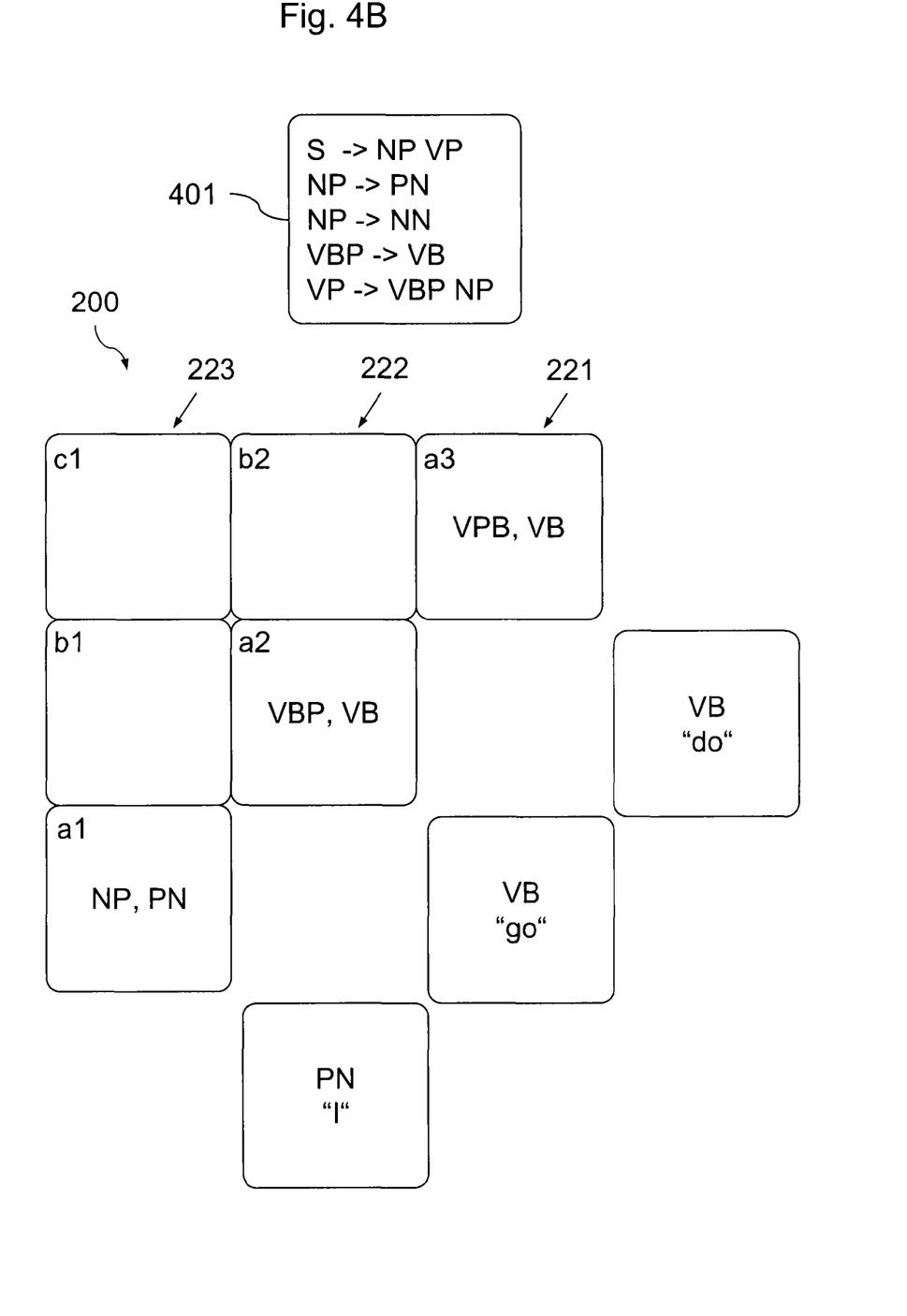
FIG. 4B is a schematic diagram of a parse table illustrating parsing of an ungrammatical sentence with the rule set of FIG. 4A.
Figure 4C:
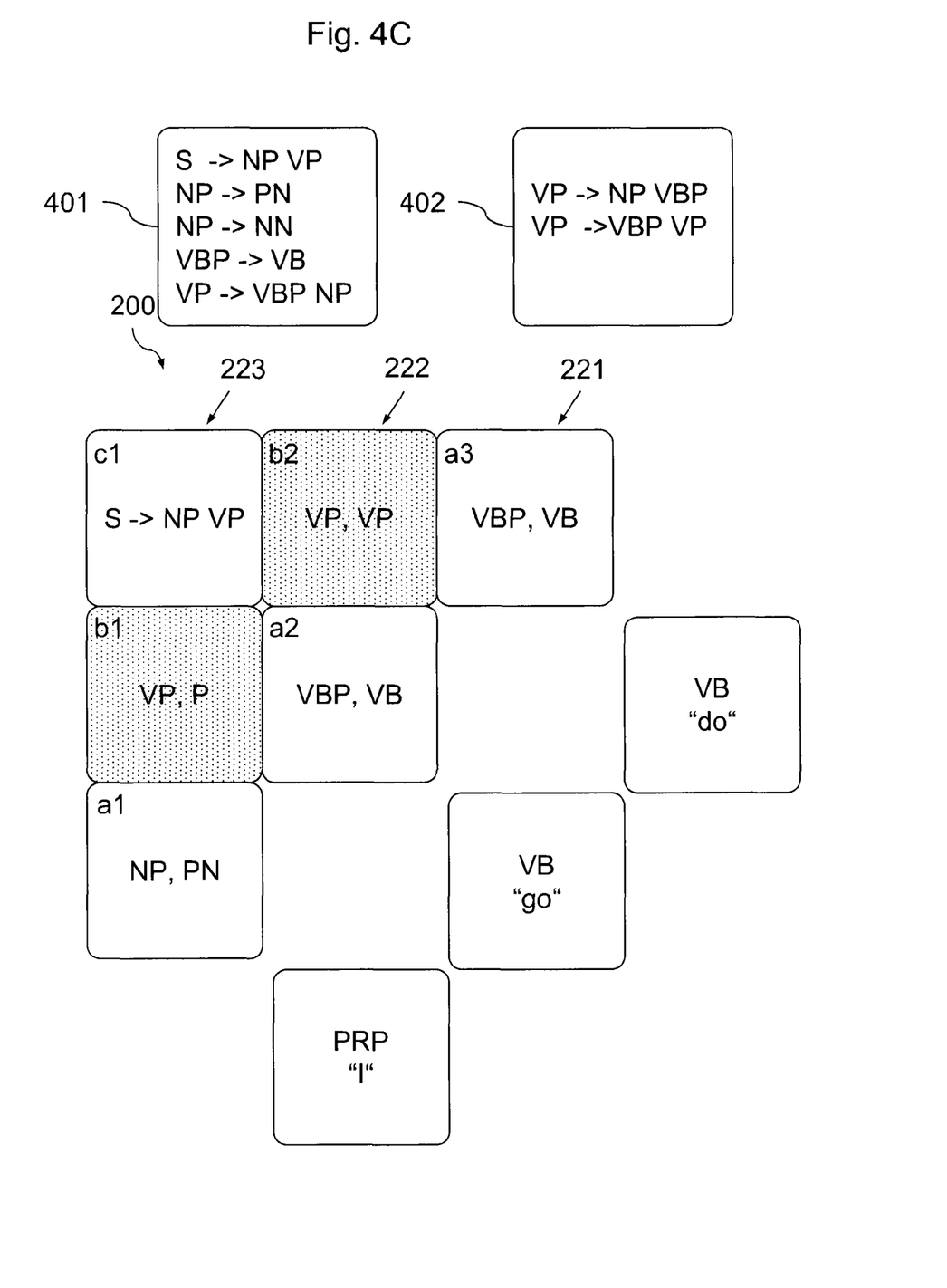
FIG. 4C is a schematic diagram of a parse table and a rule set including artificial production rules illustrating the use of artificial production rules for parsing the ungrammatical sentence of FIG. 4B for illustrating a language processing method according to another embodiment.

FIGS. 4A to 4C refer to an example illustrating the mode of operation of the parser unit 100 according to the embodiments. The target language is English and the tokens are words. The lexical analyzing unit 920 determines the respective part of speech (lexical category) of the tokens "I", "go", and "home". The token "I" is a personal pronoun, (PN), "go" is a verb having a base form (VB) and "home" is a noun (NN). Hence the input string includes the tokens "I", "go", "home". The corresponding input sequence of token classifiers contains the members "PN", "VB", "NN". The input sequence may include additional information about the tokens.

The regular rule set of the grammar 401 contains a first production rule obtaining the constituent information "sentence" (symbol S) from a sequence containing the constituent information "noun phrase" (symbol NP) and the constituent information "verb phrase" (symbol VP) directly following the noun phrase (NP). A second production rule produces a noun phrase (NP) from a personal pronoun (PN). A third production rule produces a noun phrase (NP) from a noun (NN). A fourth production rule produces a verb (VBP) which is not the third person singular present tense from a verb in the base form (VB). A fifth production rule generates a verb phrase (VP) from a combination of a non-third person singular present tense verb (VBP) and a noun phrase (NP). The parse algorithm writes the token classifiers of the input sequence into the first line 221 of the parse table 200 and applies the non-combining second, third, and fourth production rules of the grammar 401.

The resulting contents of the terminal cells in the first line 221 contain the constituent information illustrated in FIG. 4A. The parse algorithm continues with trying to fill the first non-terminal cell b1 in the second line 222 with constituent information obtained by a regular production rule matching any of the symbols of cell a1 at the first position with any of the symbols of cell a2 at the second position. Since no such production rule exists in the grammar 401, cell b1 remains "empty". The second cell b2 of the second line 212 can be filled with the symbol VP since the fifth production rule VP→VBP NP combines the cells a2 and a3. After having completed the second line 222, the parsing algorithm continues with the third line 223. The first production rule S→NP VP combines the cells a1 and b2. The root cell at the top of the parse tree is filled with a symbol identifying a complete English sentence. The parse algorithm was successful by applying exclusively the regular production rules of grammar 401.

FIG. 4B refers to an example, where the input string is an ungrammatical English sentence. Since the rule set 401 does not contain any production rule combining any of the symbols (token classifiers) of cell a1 with any of the symbols of cell a2 or any of the symbols of cell a 2 with any of the symbols of cell a3, the cells b1 and b2 in the second line 212 remain empty. Since for filling the cell c1 at least one filled cell b1 or b2 is necessary, also cell c1 remains empty. The input string "I" "go" "do" is not parsable with the regular production rules of grammar 401 alone. The monitoring unit 113 detects that the parse applying the regular rules leaves the root cell empty and controls the parser processor 110 to change into the recovery mode.

FIG. 4C illustrates the mode of operation of the recovery mode of the parser unit 100 in the case of the input string "I" "go" "do". The recovery mode may use the results of the non-combining regular production rules obtained in the regular mode. When the parse algorithm proceeds to the first cell b1 of the second line 222, in the recovery mode the tracing unit 117 detects that the regular grammar 401 leaves the first cell b1 of the second line 222 empty. In response thereto, the control unit 115 controls the rule generator unit 114 to check the symbols in the cells a1, a2 of the first line 221, which are assigned to the cell b1, and to generate artificial production rules.

The right hand side of the artificial production rules is given by the symbols in the cells a1 and a2 and may be (i)

NP VBP, (ii) NP VB, (iii) PN VBP or (iv) PN VB. The left hand side of the artificial production rules is any one of the symbols appearing in either the first cell a1 or the second cell a2, hence (i) NP, (ii) PN, (iii) VBP, or (iv) VB resulting in sixteen candidate rules, which may have the same or different probability values. For example, the artificial production rule VP->NP VBP may have the highest probability value among the candidate rules and the parse algorithm selects the production rule VP->NP VBP resulting in constituent information identified by the symbol VP in cell b1.

The parse algorithm then proceeds to the second cell b2 of the second line 212. Since no regular production rule combines the symbols of cells a2 and a3, the parse algorithm generates further candidate rules based on the symbols of the cells a2 and a3 and selects the production rule VP->VBP VP for filling cell b2. When proceeding to the root cell c1 in the third line 223 the parse algorithm finds a regular production rule combining the cells a1 and b2.

The embodiments provide a parser that provides a complete parse tree even for sentences that are not grammatically correct. But in practical applications even sentences which are not grammatically correct can convey information which is sufficient for further processing, for example for controlling a machine process via a man-machine interface or for natural language processing detecting a sentiment, an approval or a refusal of a user confronted with an option. In addition, rule sets of grammars typically do not cover a natural language completely. The embodiments prevent a parser from classifying a grammatical correct sentence as an ungrammatical sentence.

Since the recovery parsing provided by the embodiments adds additional production rules in previously empty cells of the parse table, the probability that the parse will result in a sentence symbol becomes higher. According to another embodiment, the tracing unit 117 may check whether there is a sentence symbol in the root cell at the end of the recovering parsing algorithm. If not, the control unit 115 may control (i) the rule generator unit 114 to modify all artificial production rules to include the constituent information "sentence" (symbol S) on the left hand side and (ii) the parse processor 110 to use the modified artificial production rules when determining the symbol for the root node. The parse algorithm will then select the most likely underlying parse tree based on the regular, the artificial and the modified artificial production rules. According to another embodiment, the parse processor 110 may repeat the complete parse with the modified artificial production rules.

According to another embodiment, a learning unit 118 keeps track of the applied artificial production rules and evaluates a statistic. The learning unit 118 may increase the probability values for successfully applied artificial production rules, for example by a predetermined factor for each successful application. Further parses then prefer the previously successfully applied artificial production rules. Another embodiment may provide that the learning unit 118 transfers an artificial production rule that has proved to be applied successful very frequently to the memory 114 holding the regular production rules. As a result, frequently applied artificial production rules are handled in the same way as regular production rules. The number of times the parser unit 100 changes into the recovery mode is reduced. In this way, production rules initially missing in the grammar can be amended with time and not-grammatical errors, which are notorious in a certain domain, are accepted to be part of the language used in context of the application.

Other embodiments provide a machine-learning algorithm, which is trained on a corpus in order to learn to differentiate between a missing grammar rule and an ungrammatical (grammatically wrong) sentence. The machine-learning algorithm may provide a classifier which may be used by the application to decide whether or not a rule will be added to the regular production rules. The classifier may be determined using features and feature combinations from the underlying parse tree, for example partial tree structures, combinations or words or part-of-speech phrase text as well as word distance based features.

The parser unit 100 and each of the sub units of the parser unit 100 as illustrated in FIG. 2A a may be implemented using ICs (integrated circuits), FPGAs (field programmable arrays) or at least one ASIC (application specific integrated circuit). One, some or all of the sub units of the parser unit 100 may include or consist of a logic device for supporting or fully implementing the described functions. Such a logic device may include, but is not limited to, an ASIC, an FBGA or a GAL (generate-array of logic) and their equivalents. According to other embodiments, one, some or all of the sub units of the parser unit 100 may be realized completely in software, for example in a microprocessor or another integrated circuit providing digital processing capabilities.

Figure 5:
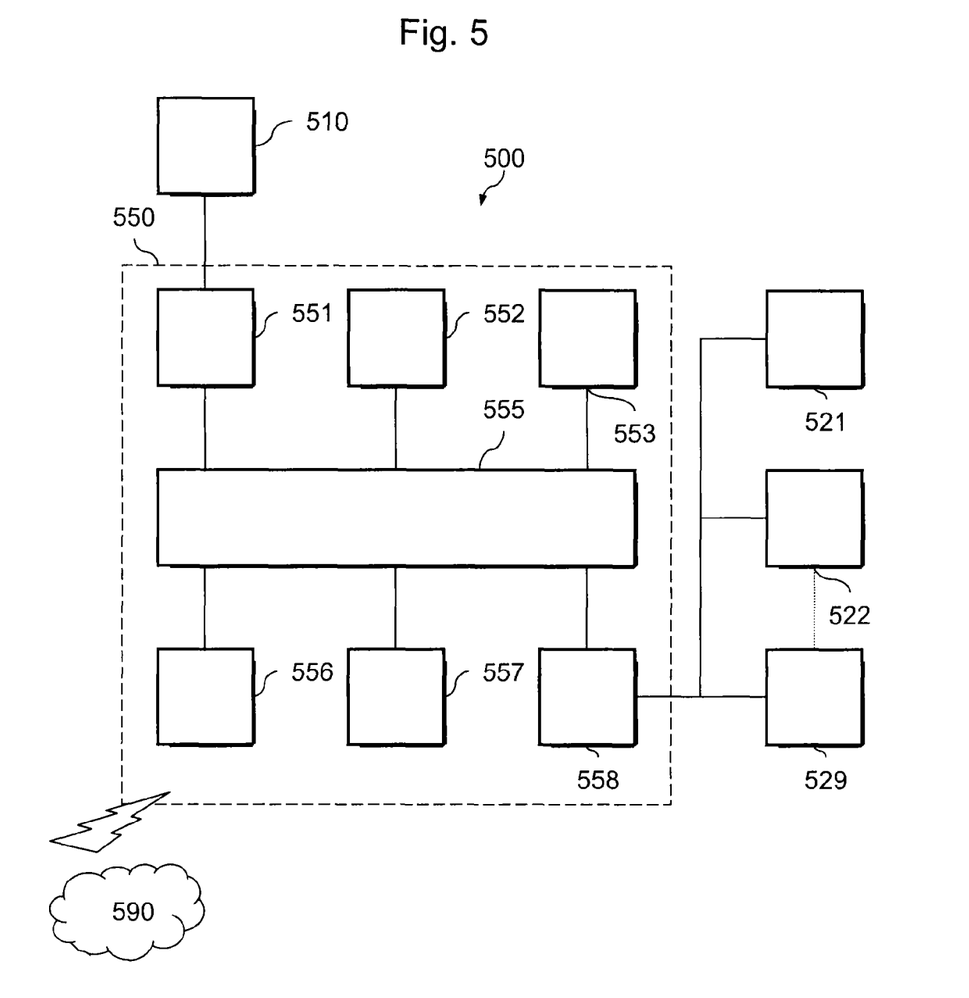
FIG. 5 is a schematic block diagram of a processing system in accordance with an embodiment related to a computer program for carrying out a natural language processing method.

According to other embodiments, one, some or all of the sub units of the parser unit 100 may be realized completely in software, for example in a computer program running a processing system 550 of an electronic apparatus 500 as shown in FIG. 5.

The processing system 550 may be implemented using a microprocessor or its equivalent, such as a CPU (central processing unit) 557 or an ASP (application specific processor) (not shown). The CPU 557 utilizes a computer readable storage medium, such as a memory 552 (e.g., ROM, EPROM, EEPROM, flash memory, static memory, DRAM, SDRAM, and equivalents). Programs stored in the memory 552 control the CPU 557 to perform a language processing method according to the embodiments. In another aspect, results of the language processing method or the input of natural language in accordance with this disclosure can be displayed by a display controller 551 to a monitor 510. The display controller 551 may include at least one GPU (graphic processing unit) for improved computational efficiency. An input/output (I/O) interface 558 may be provided for inputting data from a keyboard 521 or a pointing device 522 for controlling parameters for the various processes and algorithms of the disclosure. The monitor 510 may be provided with a touch-sensitive interface as a command/instruction interface. Other peripherals 529 can be incorporated including a scanner or a web cam.

The above-noted components may be coupled to a network 590 such as the Internet or a local intranet, via a network interface 556 for the transmission and/or reception of data, including controllable parameters. The network 590 provides a communication path to the electronic apparatus 500, which can be provided by way of packets of data. Additionally a central BUS 555 is provided to connect the above hardware components together and to provide at least one part of a digital communication there between.

Insofar as embodiments of the invention have been described as being implemented at least in part by the software-controlled electronic apparatus 500, any non-transitory machine-readable medium carrying such software, such as an optical disc, magnetic disc, semiconductor memory or the like represents an embodiment of the present invention.

Figure 6A:
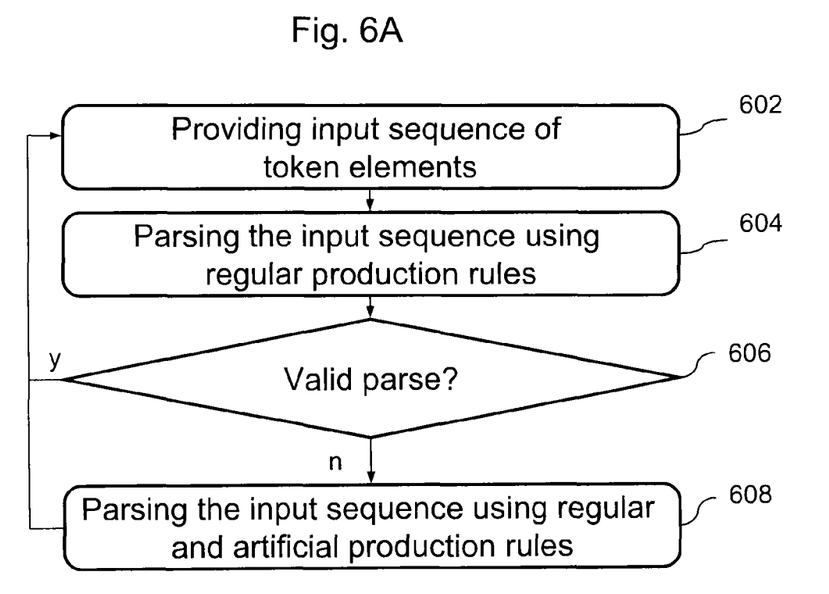
FIG. 6A is a simplified flow chart illustrating a natural language processing method according to a further embodiment.

FIG. 6A refers to a language processing method. An input sequence is provided that includes token elements, wherein each token element contains a token of an input string and/or at least one corresponding token classifier. (602). The input sequence is parsed using a parsing algorithm in a first mode that applies regular production rules (604). The validity of the parse is determined, e.g. by checking whether a multi-token classifier is obtained that encompasses all token classifiers of the input sequence (606). In the affirmative, the method proceeds with the next input sequence. Otherwise, if the first mode parsing does not result in a multi-token classifier encompassing all tokens of the input string, the input sequence is parsed using the parsing algorithm in a second mode that applies artificial production rules in addition to the regular production rules (608).

Figure 6B:
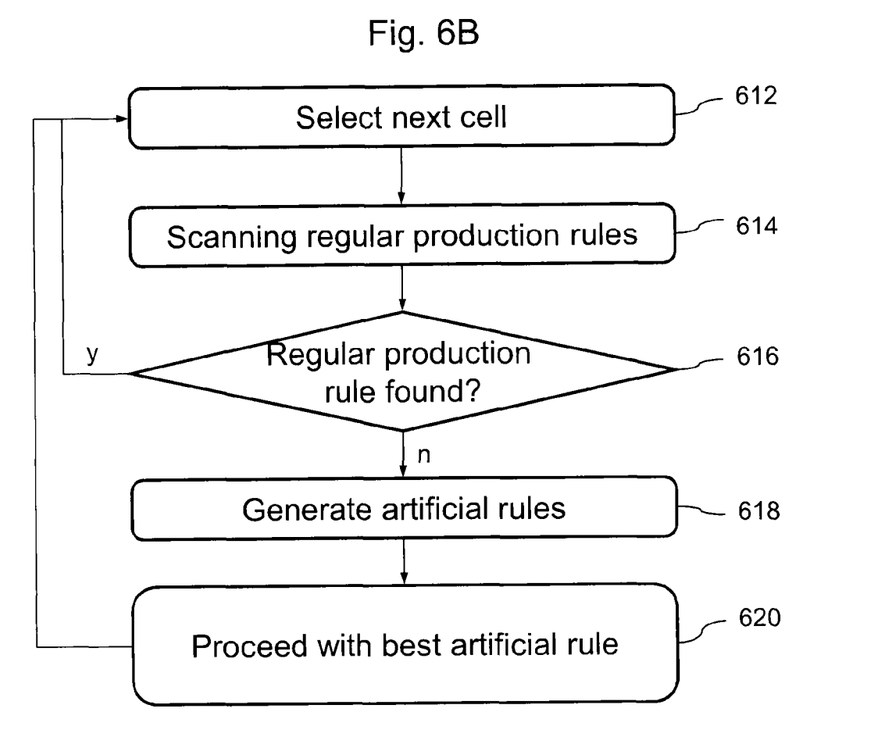
FIG. 6B is a simplified flow chart illustrating a detail of an embodiment of the language processing method of FIG. 6A.

FIG. 6B refers to an embodiment of step 608 of the method of FIG. 6A. In the second mode, the parsing algorithm selects a next cell of the parse table (612). Then the parsing algorithm scans the regular production rules (614) and checks whether any of the regular production rules can be applied (616). If the parsing algorithm finds a regular production rule that can be applied, it applies the found regular production rule and proceeds with the next cell. If not, the parsing algorithm generates a set of artificial production rules (618). Then the parsing algorithm applies the best matching artificial production rule (620) and proceeds with the next cell.

Figure 6C:
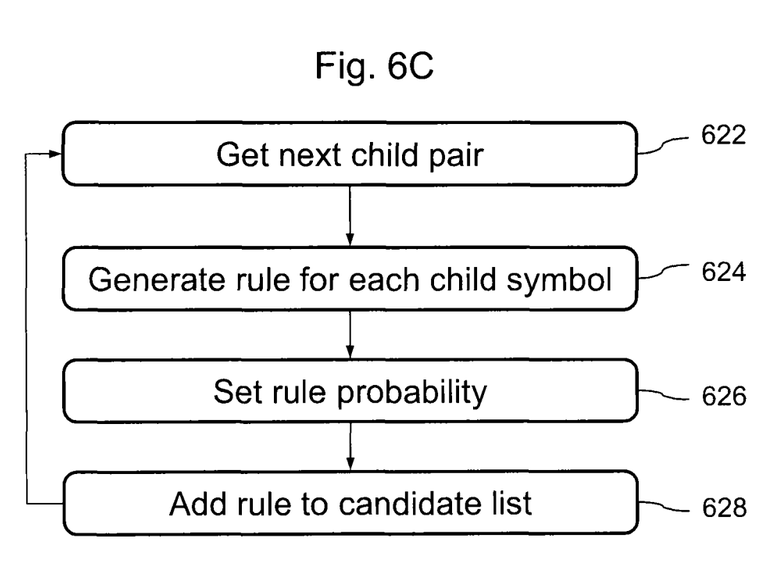
FIG. 6C is a simplified flow chart illustrating a detail of another embodiment of the language processing method of FIG. 6A.

FIG. 6C refers to a detail of the generation of artificial rules. When generating the artificial production rules, a child phrase pair is selected (622). For each symbol of each child phrase an artificial production rule is generated (624). For each artificial rule a rule probability value is set (626) and the obtained artificial rule is added to a candidate list of artificial rules (628).

Obviously, numerous modifications and variations of the present disclosure are possible in light of the above teachings. It is therefore to be understood that within the scope of the appended claims, the invention may be practiced otherwise than as specifically described herein.

CROSS-REFERENCE TO RELATED APPLICATIONS

The present application claims priority of EP patent application No. 12 007 485.1 filed on 2 Nov. 2012, the entire contents of which are incorporated herein by reference.

The invention claimed is:

1. A language processing method, comprising:
receiving an user utterance as an input sequence of token elements;
parsing, using a parsing processor, the input sequence of the token elements using a parsing algorithm in a first mode applying regular production rules on the token elements and on multi-token classifiers for phrases obtained from the token elements, wherein each token element contains a token of an input string and/or at least one corresponding token classifier;
controlling, when the first mode parsing does not result in a multi-token phrase encompassing all tokens of the input string, the parsing processor to parse the input sequence using the parsing algorithm in a second mode applying both the regular and artificial production rules, wherein the second mode comprises generating the artificial production rules on the basis of the input sequence and intermediate results of the parsing using the parsing algorithm in the first mode, the intermediate results being based on lexical category of the token of the input string; and
matching the parsed input sequence to one of a plurality of predefined machine commands to generate a command based on the input sequence, wherein
the parsing algorithm comprises calculating probabilities for all possible subsequences and selecting, for each sequence of token classifiers within the input sequence, the subsequences with a highest probability, and
each of the artificial production rules has a probability value lower than any of the regular production rules, the probability value being set such that at most one artificial production rule of the artificial production rules is used when parsing the input sequence using the parsing algorithm in the second mode, and the probability value being increased when the artificial production rule is successfully applied.

2. The method according to claim 1, wherein
the artificial production rules are derived from lexical categories of the tokens of the input string.

3. The method according to claim 1, comprising
checking, for every possible sequence of token elements within the input sequence, whether the sequence can be construed on the basis of the regular production rules, and
applying, only when the sequence cannot be construed on the basis of the regular production rules, one of the artificial production rules to obtain constituent information descriptive for one or more grammatical functions of the sequence.

4. The method according to claim 1, wherein
the parsing algorithm generates parse information representing a parse table with cells, wherein each cell is assigned to one of the possible sequences of token classifiers within the input sequence and contains (i) constituent information descriptive for one or more grammatical functions assigned by the production rules to a sequence assigned to the cell and (ii) a parse tree information descriptive for a derivation of the one or more grammatical functions of the sequence from the token classifiers.

5. The method according to claim 1, wherein
the parsing algorithm includes a Cocke-Younger-Kasami algorithm.

6. The method according to claim 1, wherein
the tokens are words.

7. The method according to claim 1, comprising
managing information about the use of artificial production rules and
redefining and using as a regular production rule at least one of the artificial production rules which is applied more often than other artificial production rules.

8. A non-transitory computer readable medium including executable instructions, which when executed by a computer cause the computer to execute a language processing method, the method comprising:
receiving an user utterance as an input sequence of token elements;
parsing the input sequence of the token elements using a parsing algorithm in a first mode applying regular production rules on the token elements and on multi-token classifiers for phrases obtained from the token elements, wherein each token element contains a token of an input string and/or at least one corresponding token classifier;
parsing, when the first mode parsing does not result in a multi-token phrase encompassing all tokens of the input string, the input sequence using the parsing algorithm in a second mode applying both the regular and artificial production rules, wherein the second mode comprises generating the artificial production rules on the basis of the input sequence and intermediate results of the parsing using the parsing algorithm in the first mode, the intermediate results being based on lexical category of the token of the input string; and matching the parsed input sequence to one of a plurality of predefined machine commands to generate a command based on the input sequence, wherein the parsing algorithm comprises calculating probabilities for all possible subsequences and selecting, for each sequence of token classifiers within the input sequence, the subsequences with a highest probability, and each of the artificial production rules has a probability value lower than any of the regular production rules, the probability value being set such that at most one artificial production rule of the artificial production rules is used when parsing the input sequence using the parsing algorithm in the second mode, and the probability value being increased when the artificial production rule is successfully applied.

9. An integrated circuit comprising;

parsing processing circuitry configured to receive an user utterance as an input sequence of token elements and parse the input sequence of the token elements for an input string containing tokens using a parsing algorithm in a first mode applying regular production rules on the token elements and on multi-token classifiers for phrases obtained from the token classifiers, wherein each token element contains a token of an input string and/or at least one corresponding token classifier;

control circuitry connected to the parsing processing circuitry and configured to control the parsing processing circuitry to parse, when the first mode parsing does not result in a multi-token classifier encompassing all tokens of the input string, the input sequence using the parsing algorithm in a second mode applying both the regular and artificial production rules;

rule generating circuitry configured to generate the artificial production rules on the basis of the input sequence and intermediate results of the parsing using the parsing algorithm in the first mode, the intermediate results being based on lexical category of the token of the input string; and analysing circuitry configured to match the parsed input sequence to one of a plurality of predefined machine commands to generate a command based on the input sequence, wherein the parsing algorithm comprises calculating probabilities for all possible subsequences building a sequence and selecting, for each sequence of token classifiers within the input sequence, the subsequences with the highest probability, and each of the artificial production rules has a probability value lower than any of the regular production rules, the probability value being set such that at most one artificial production rule of the artificial production rules is used when parsing the input sequence using the parsing algorithm in the second mode, and the probability value being increased when the artificial production rule is successfully applied.

10. The integrated circuit according to claim 9, wherein the rule generating circuitry derives the artificial production rules from lexical categories of the tokens.

11. The integrated circuit according to claim 9, comprising tracing circuitry configured to check, for every possible sequence of token classifiers within the input sequence, whether the sequence can be construed on the basis of the regular production rules, wherein the parsing processing circuitry applies artificial production rules only when the respective sequence cannot be construed on the basis of the regular production rules.

12. The integrated circuit according to claim 9, wherein the parsing algorithm comprises generating parse information representing a parse table with cells, wherein each cell is assigned to one of the possible sequences of tokens within the input string and contains (i) constituent information descriptive for one or more grammatical functions assigned by the production rules to a sequence assigned to the cell and (ii) a parse tree information descriptive for a derivation of the one or more grammatical functions of the sequence from the tokens.

13. The integrated circuit according to claim 9, comprising rule managing circuitry configured (i) to trace information about the use of artificial production rules and (ii) to redefine, as a regular production rule, at least one of the artificial production rules which is applied more often than other artificial production rules.

* * * * *